(12) United States Patent
Takeda et al.

(10) Patent No.: US 6,772,517 B2
(45) Date of Patent: Aug. 10, 2004

(54) HEAT INSULATING MATERIAL

(75) Inventors: Fumihito Takeda, Aichi (JP);
Masayuki Yamashita, Aichi (JP);
Junichi Ogawa, Shizuoka (JP);
Toshiyuki Anji, Shizuoka (JP);
Yoshihiro Kawasaki, Shizuoka (JP)

(73) Assignees: Mitsubishi Heavy Industries, Ltd., Tokyo (JP); Nichias Corporation, Tokyo (JP)

( * ) Notice: Subject to any disclaimer, the term of this patent is extended or adjusted under 35 U.S.C. 154(b) by 43 days.

(21) Appl. No.: 10/209,716

(22) Filed: Jul. 31, 2002

(65) Prior Publication Data

US 2002/0187699 A1 Dec. 12, 2002

Related U.S. Application Data

(63) Continuation of application No. 09/536,546, filed on Mar. 28, 2000, now abandoned.

(30) Foreign Application Priority Data

Mar. 31, 1999 (JP) .......................................... 11-091728

(51) Int. Cl.[7] ................................................ B23B 9/00
(52) U.S. Cl. ...................... 29/887; 29/897.32; 29/897.2; 442/381; 442/383; 428/57; 428/71; 428/102; 264/299; 264/319; 264/DIG. 54
(58) Field of Search ............................... 29/887, 897.32, 29/897.2; 442/381, 383, 386, 387, 389, 417, 172, 178, 180; 428/57, 71, 76, 102, 68, 74; 165/186; 264/299, 319, DIG. 54; 156/60, 70, 91

(56) References Cited

U.S. PATENT DOCUMENTS 4,373,003 A * 2/1983 Schomburg et al. ........ 442/136
4,567,076 A * 1/1986 Therrien ..................... 428/102
4,877,689 A * 10/1989 Onstott ....................... 428/607
5,080,306 A * 1/1992 Porter et al. ............. 244/158 A
5,451,448 A * 9/1995 Sawko et al. ............... 428/175

FOREIGN PATENT DOCUMENTS

FR    0 501 861 A1 * 2/1982    ........... F16L/59/14
JP       10246391    * 9/1998    ........... F16L/59/02

OTHER PUBLICATIONS

Miller, Stanely, "Insulation Blankets for High–Temperature Use", May 1986, NASA Tech Brief.*

Keller K. et al., "High–Temperature Insulations", Nov. 1994, ESA Bulletin No. 80.*

Sawko P. et al., "Tailorable Advanced Blanket Insulation (TABI)", Mar. 1998, NASA Tech Brief.*

* cited by examiner

Primary Examiner—Peter Vo
Assistant Examiner—Stephen Kenny
(74) Attorney, Agent, or Firm—Flynn, Thiel, Boutell & Tanis, P.C.

(57) ABSTRACT

In order to provide a light heat insulating member having both an extremely low thermal conductivity and a high heat resistance in an atmosphere, in which pressure is reduced, a core member consisting of accumulated heat resisting inorganic fiber is put between a high temperature side skin member and a low temperature side skin member made of heat resisting fiber textile and these three members are tied all together in one body by sewing, using heat resisting inorganic fiber thread. It is possible to reduce the thermal conductivity to an extremely small value by adding a material having a high emissivity (SiC powder, SiC whisker) to the core member and to prevent scattering of material constructing the core member by covering side wall parts of the core member by the high temperature skin member.

3 Claims, 3 Drawing Sheets

HEAT INSULATING MATERIAL

This application is a continuation of application Ser. No. 09/536,546, filed on Mar. 28, 2000 now abandoned.

FIELD OF THE INVENTION

The present invention relates to a heat insulating material having an extremely low thermal conductivity in a vacuum and flexibility and in more detail to a heat insulating material suitable for insulating a body of a space shuttle, a rocket, etc.

DESCRIPTION OF THE PRIOR ART

Heretofore, as this kind of heat insulating material, a heat insulating structure has been proposed in JP-A-Sho 59-106954, in which a core member consisting of accumulated heat resisting inorganic fiber, which is not deformed at sewing, is put between a high temperature side skin member and a low temperature side skin member made of heat resisting inorganic fiber textile and these three members are tied in one body by sewing, using heat resisting inorganic fiber thread.

However such a heat insulating structure has disadvantages not only that seams are easily displaced so that it is not possible to prevent scattering of material constructing the core member but also that fiber constructing the skin members comes often untied so that the structure is easily destroyed, because side wall parts of the structure are only sewn by using sewing thread.

In addition, since the core member consisting of accumulated heat resisting inorganic fiber has a relatively large thermal conductivity in vacuum and the thermal conductivity is further increased by influences of sewing thread and pinholes made at sewing, it is necessary that the thickness for insulation is great and therefore it has a drawback that the heat insulating material should be heavy.

SUMMARY OF THE INVENTION

The present invention has been made in order to remove the above-mentioned disadvantages of the heat insulating structure and a heat insulating material, in which a core member consisting of accumulated heat resisting inorganic fiber is put between a high temperature side skin member and a low temperature side skin member made of heat resisting inorganic fiber textile and these three members are made in one body, according to the present invention, is characterized in that side wall parts of the core material is covered with the high temperature skin member and that the core member consists of 100 weight parts of heat resisting inorganic fiber and 15 to 50 weight parts of SiC powder and/or SiC whisker.

DESCRIPTION OF THE PREFERRED EMBODIMENTS

Figure 1:
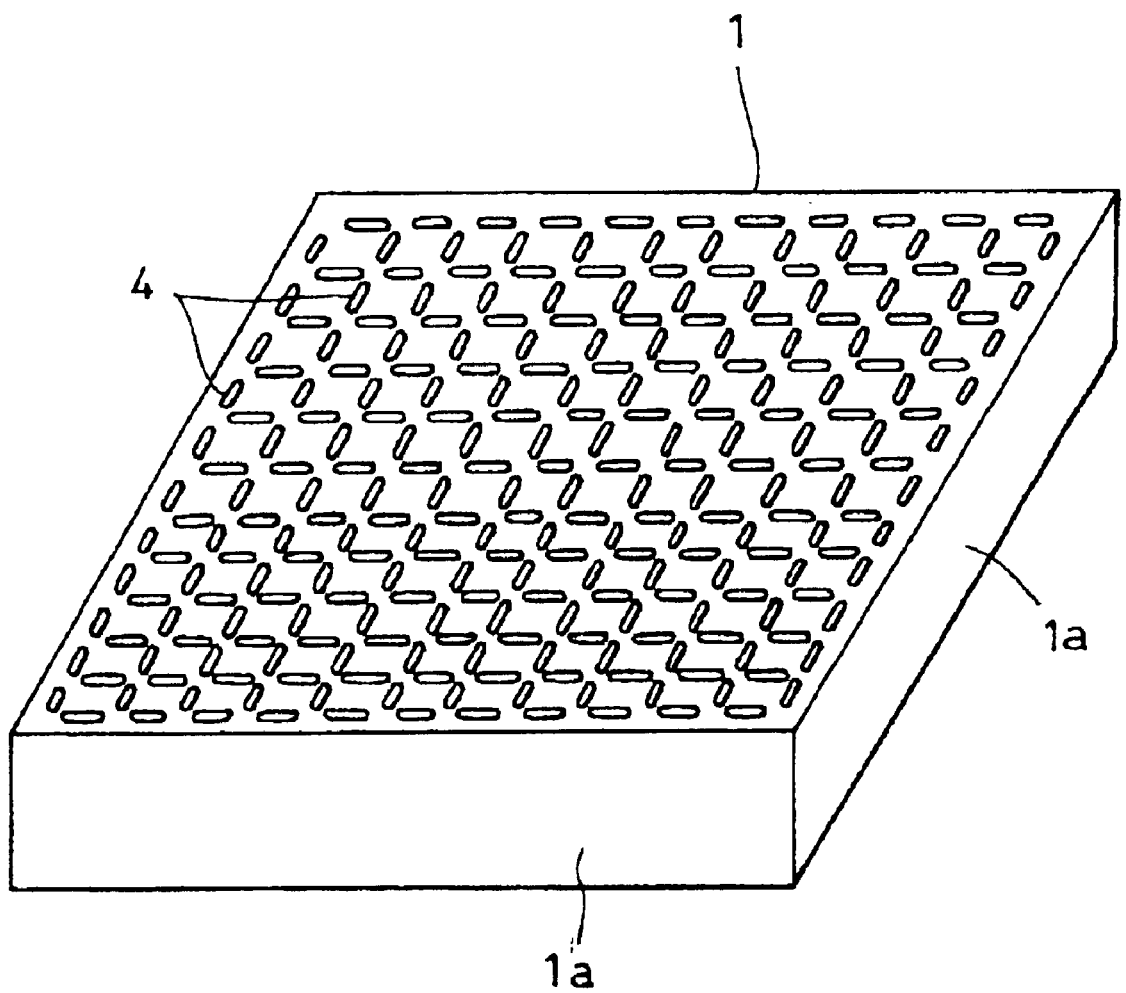
FIG. 1 is a perspective view of a heat insulating material showing an embodiment of the present invention.
Figure 2:
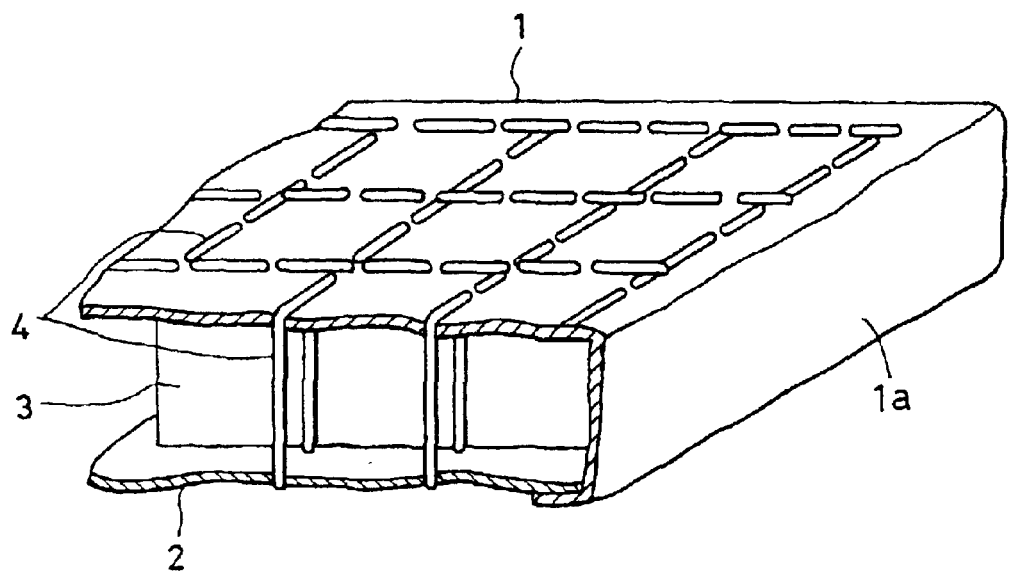
FIG. 2 is a partial enlarged cross-sectional view of the heat insulating material.

In a preferred embodiment of the present invention, as indicated in FIGS. 1 and 2, a heat insulating material is formed by putting a core member consisting of accumulated heat resisting inorganic fiber, which is not deformed at sewing, between a high temperature side skin member 1 and a low temperature side skin member 2 made of heat resisting inorganic fiber textile and by tying these three members in one body by sewing, using heat resisting inorganic fiber thread, in which the high temperature side skin member 1 is bent so as to form a covering part 1a enclosing side wall parts of the core member and SiC powder and/or SiC whisker are/is mixed with the accumulated fiber and hardened by using organic binder to form the core member.

Material of the core member is not scattered and destruction thereof can be prevented owing to the fact that the core member 3 is covered by the covering part 1a of the high temperature side skin member 1, which encloses the side wall parts thereof. It is preferable to decompose and remove the organic binder in the core member by heating it after sewing. However, heating may be also delayed so that decomposing by heat occurs in the course of utilization.

Textile excellent in the heat resisting property such as alumina continuous fiber cloth, silica cloth, etc. is used for the high temperature side skin member 1. On the other hand, glass fiber, which is not so excellent in the heat resisting property, but cheap, can be used for the low temperature side skin member 2. Further inorganic fiber thread having a heat resisting property, which is as high as or higher than that of the high temperature side skin member 1 is used for the sewing thread 4 used for tying these members in one body by sewing.

Figure 4:
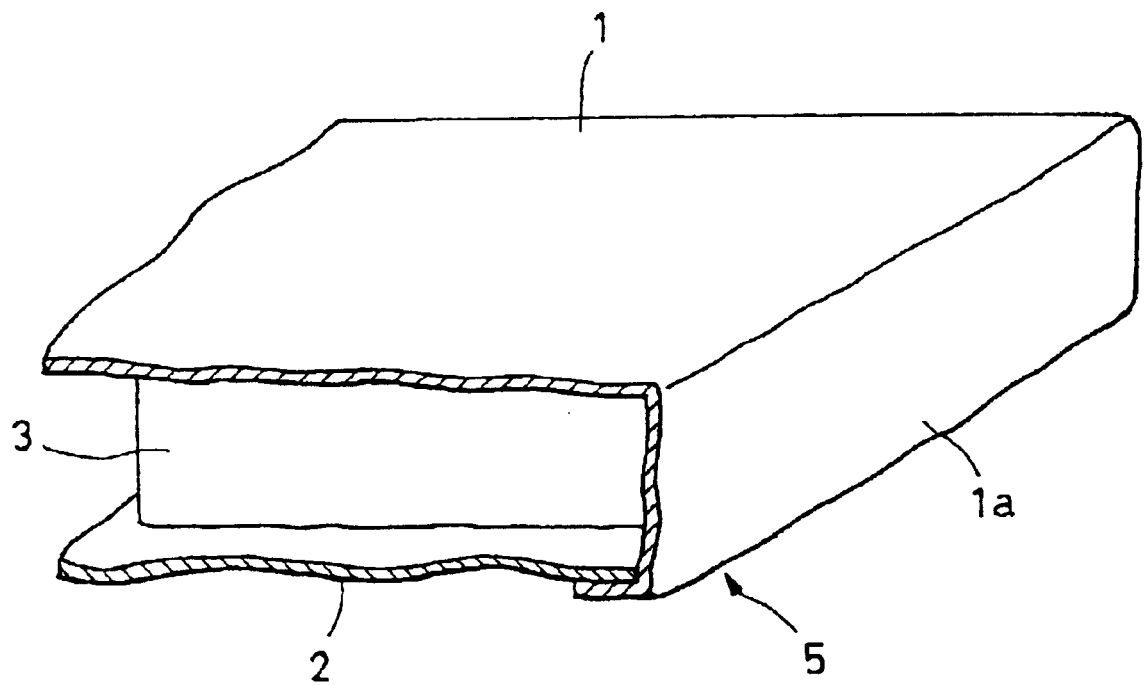
FIG. 4 is a perspective view of a heat insulating material showing another embodiment of the present invention.

A bag-shaped covering member 5 may be formed in advance, as indicated in FIG. 4, so that the high temperature side skin member 1 and the low temperature side skin member 2 enclose the core member 3 together and the core member 3 is put therein to form one body.

In this case, if the bag-shaped covering member 5 has such dimensions that the core member 3 can be just accommodated therein, it is unnecessary to tie it with the covering member 5 by sewing. It is a matter of course that the core member 3 and the covering member 5 may be made in one body by sewing or adhesion.

Further, in the structures indicated in FIGS. 2 and 4, the high temperature side skin member 1 and the low temperature side skin member 2 may be made of the same material. In this case, the whole is constructed by a material, of which the high temperature side member is made.

The core member 3 is a base member of the heat insulating material and it is important that the thermal conductivity is as small as possible. Heat is transmitted by conduction and radiation in vacuum. However, particularly in high temperatures, radiation is the major part of heat transmission.

The inventors of the present invention have found as a result of experiments on various materials that the thermal conductivity is extremely small, when SiC having a high emissivity is added, and accomplished the present invention.

It is efficient to use SiC in a state of whisker or fine powder. It is suitable to use 15 to 50 weight parts of SiC powder and/or SiC whisker with respect to 100 weight parts of heat resisting inorganic fiber, which is the main material constructing the core member. The effect of decreasing the heat conductivity is small, both when more SiC is used and when less SiC is used than this region. It is supposed that screening against radiation is insufficient, when SiC is less than 15 weight parts and that the thermal conductivity increases due to the fact that molecules of SiC are brought into contact with each other, when SiC is more than 50 weight parts.

It is in order to give the heat insulating material a definite shape and at the same time to obtain a satisfactory strength as a heat insulator that the skin members and the core member are tied by sewing, using sewing thread.

Although no strength as high as that obtained by sewing can be achieved, the skin members may be stuck to the core member by adhesion. They may be stuck thereto both by sewing and by adhesion.

Mounting of the heat insulating material may be effected by adhering it directly to a body, on which it should be executed.

In addition, it is possible to improve further resistance against high speed wind or resistance against collision of dust or rain drops by coating the surface of the skin member in the heat insulating material or by mounting a hard panel having a high emissivity thereon.

Several modes of realization will be explained below on the basis of concrete examples.

Embodiment 1

Silica fiber (Q fiber fabricated by Johns Manville) 270 g, SiC whisker (fabricated by Tateho Chemical Industries Co., Ltd.) 90 g and a 25% solution of polyester resin 100 g were agitated in water 30 liter, until a slurry was obtained. Thereafter the slurry was poured into a die frame, at the bottom of which a metal net made of stainless steel was set, to dehydrate it. In this way an accumulated fiber plate having a size of 300×300×40 mm$^3$ was obtained. Then this accumulated fiber plate was dried in a ventilation type dryer at 105° C. to obtain a core member. This core member had a density of 0.1 g/cm$^3$ after having been heated in air to burn out organic substance. The thermal conductivity obtained by measurement at 800° C. in an atmosphere of 0.01 Torr was extremely small, which was 0.025 W/mK.

The core member thus obtained was put between a high temperature side skin member made of alumina fiber cloth (NEXTEL AF-14 fabricated by 3M Co., Ltd.) and a low temperature side skin member made of glass cloth and they were tied together by using sewing thread (NEXTEL AT-21 fabricated by 3M Co., Ltd.). The sewing was effected with a pitch of 8 mm and a sewing interval of 25 mm. Side wall parts of the core member were covered by the high temperature side skin member. The core member was not deformed even by tensile force of the sewing thread and had a uniform thickness. This was heated at 470° C. to decompose organic substance.

The heat insulating material thus obtained had a thermal conductivity of 0.035 W/mK at 800° C. in an atmosphere of 0.01 Torr and a flexibility, with which it could be fitted to a complicated curved surface. In addition, no material constructing the core member was scattered at manipulation or at mounting.

Figure 3:
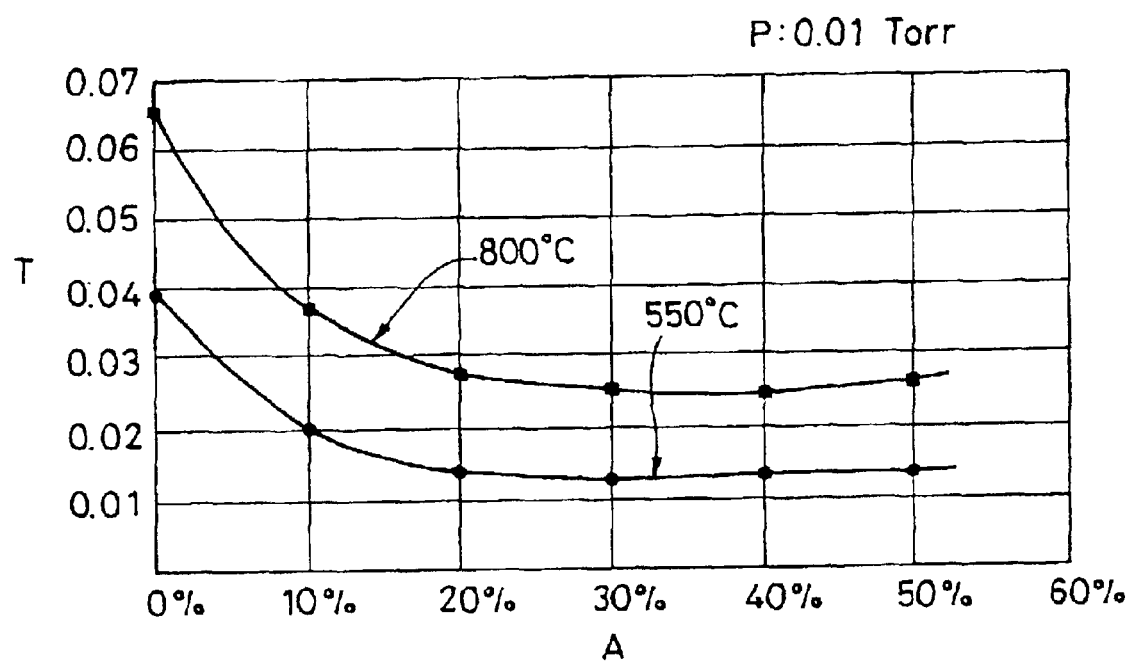
FIG. 3 is a graph indicating measurement results of the thermal conductivity of the core member.

Thermal conductivities of the core member obtained in the same way by varying the added amount of SiC whisker are indicated in FIG. 3. In FIG. 3, A represents the added amount of SiC whisker and T the thermal conductivity (W/mK), measurements being effected in an atmosphere, in which the pressure P is equal to 0.01 Torr.

Embodiment 2

Alumina fiber (MAFTEC fabricated by Mitsubishi Chemical Corporation) 270 g, SiC whisker (fabricated by Tateho Chemical Industries Co., Ltd.) 90 g and a 25% solution of polyester resin 100 g were agitated in water 30 liter, until a slurry was obtained. Thereafter the slurry was poured into a die frame, at the bottom of which a metal net made of stainless steel was set, to dehydrate it. In this way an accumulated fiber plate having a size of 300×300×40 mm$^3$ was obtained. Then this accumulated fiber plate was dried in a ventilation type dryer at 105° C. to obtain a core member. This core member had a density of 0.1 g/cm$^3$ after having been heated in air to burn out organic substance. The thermal conductivity obtained by measurement at 800° C. in an atmosphere of 0.01 Torr was extremely small, which was 0.034 W/mK.

The core member thus obtained was put between a high temperature side skin member made of alumina fiber cloth (Rubiron cloth CP-30 fabricated by Nichias Corporation) and a low temperature side skin member made of glass cloth and they were tied together by using sewing thread (NEXTEL BT-21 fabricated by 3M Co., Ltd.). The sewing was effected with a pitch of 8 mm and a sewing interval of 25 mm. Side wall parts of the core member were covered by the high temperature side skin member. The core member was not deformed even by tensile force of the sewing thread and had a uniform thickness. This was heated at 470° C. to decompose organic substance.

The heat insulating material thus obtained had a thermal conductivity of 0.041 W/mK at 800° C. in an atmosphere of 0.01 Torr and a flexibility, with which it could be fitted to a complicated curved surface. In addition, no material constructing the core member was scattered at manipulation or at mounting. Further no abnormality was found, even if it was heated to 1200° C.

EXAMPLE FOR COMPARISON

A core member having a density of 0.1 g/cm$^3$ was fabricated in the same way as in EMBODIMENT 1 apart from that no SiC whisker was used and a core member is not covered by a high temperature side skin member. The thermal conductivity measured in an atmosphere of 0.01 Torr was 0.61 W/mK at 800° C.

The core member thus obtained was put between a high temperature side skin member made of alumina fiber cloth (NEXTEL AF-14 fabricated by 3M Co., Ltd.) and a low temperature side skin member made of glass cloth and they were tied together by using sewing thread (NEXTEL AT-21 fabricated by 3M Co., Ltd.) in the same way as in EMBODIMENT 1. The sewing was effected with a pitch of 8 mm and a sewing interval of 25 mm. Damming was effected at the side wall parts of the core member with sewing thread. The core member was not deformed even by tensile force of the sewing thread and had a uniform thickness. This was heated at 470° C. to decompose organic substance.

The heat insulating material thus obtained had a large thermal conductivity, which was 0.073 W/mK at 800° C. in an atmosphere of 0.01 Torr. Although material constructing the core member was scattered through gaps of the sewing thread on the side wall parts of the core member and the thickness of the side wall parts of the core member decreased, it had a flexibility, with which it could be fitted to a complicated curved surface.

As described above in detail, since the heat insulating material according to the present invention has an extremely small thermal conductivity in vacuum, a high heat resistance and a flexibility, with which it can follow a curved surface, all together, it can be easily mounted on a body of a space shuttle, etc. and further, since the weight of the heat insulating material mounted thereon is small, it is extremely useful, as payload can be increased, etc.

What is claimed is:

1. A method for producing a heat insulating material comprising steps of;

agitating silica or alumina fiber, SiC whisker and a solution of polyester resin in water to obtain a slurry;

pouring said slurry into die frame to dehydrate it and to obtain an accumulated inorganic fiber plate;

drying said plate to obtain a core member;

putting said core member between a high temperature side skin member made of alumina fiber cloth and a low temperature side skin member made of glass cloth;

covering side wall parts of the core member by the high temperature side skin member; and tying together said high temperature side skin member, said low temperature side skin member and said core member by using thread made of heat resisting inorganic fiber.

2. A method according to claim 1, wherein said core member comprises 100 weight parts of silica or alumina fiber and 15 to 50 weight parts of SiC powder and/or whisker.

3. A method according to claim 1, wherein said heat insulating material had a thermal conductivity of 0.035 W/mK or 0.041 W/mK at 800° C. in an atmosphere of 0.01 Torr.

* * * * *